No. 768,940. PATENTED AUG. 30, 1904.
M. W. HALL.
BRAKE OR OTHER VALVE.
APPLICATION FILED APR. 2, 1903.
NO MODEL.

WITNESSES:
Fred White
Thomas Wallace

INVENTOR:
Milan W. Hall,
By Attorneys,
Arthur C. Fraser & Co.

No. 768,940. Patented August 30, 1904.

UNITED STATES PATENT OFFICE.

MILAN W. HALL, OF NEW YORK, N. Y., ASSIGNOR, BY MESNE ASSIGNMENTS, TO NOISELESS COMPRESSOR AND AIR BRAKE COMPANY, OF NEW YORK, N. Y., A CORPORATION OF NEW YORK.

BRAKE OR OTHER VALVE.

SPECIFICATION forming part of Letters Patent No. 768,940, dated August 30, 1904.

Application filed April 2, 1903. Serial No. 150,746. (No model.)

*To all whom it may concern:*

Be it known that I, MILAN W. HALL, a citizen of the United States, residing in the borough of Brooklyn, county of Kings, city and State of New York, have invented certain new and useful Improvements in Brake or other Valves, of which the following is a specification.

My invention aims to provide an improvement in valves adapted especially for use in connection with air-brake systems, as a so-called "engineer's valve." This is a three-way valve for admitting air from the reservoir or pump to the brake-cylinder to apply the brakes and for admitting the air from the brake-cylinder to an exhaust to release the brakes. The valve may also be used in various other situations, either in whole or in part. In such valves it is desirable to be able to regulate the amount of pressure admitted to the brake-cylinders, so as to apply them slightly or gradually or suddenly, as desired. The valve of my invention does this in a very simple and positive manner, and its construction, on the whole, is extremely simple, cheap, and durable.

The accompanying drawings illustrate a valve embodying my invention.

Figure 1:
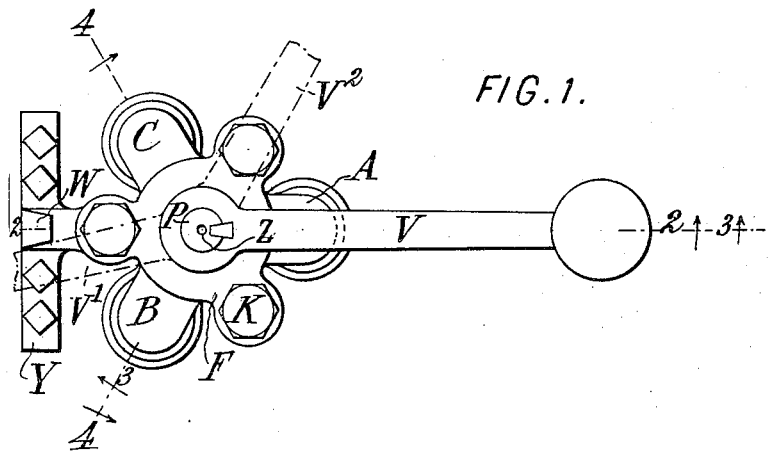
Figure 2:
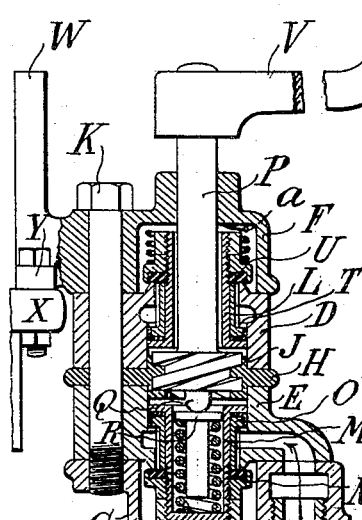
Figure 3:
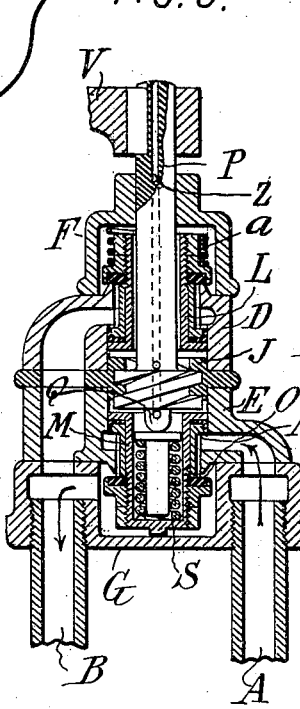
Figure 4:
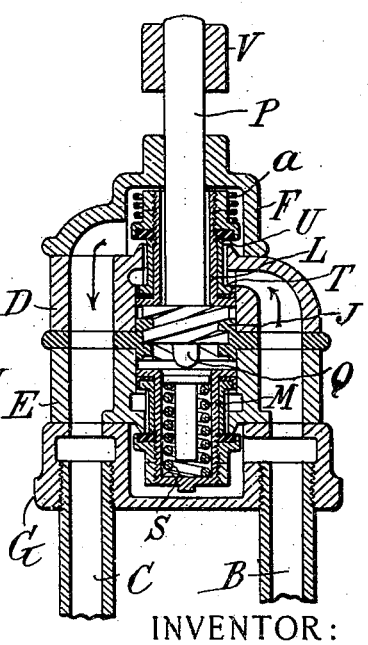

Figure 1 is a plan. Figs. 2, 3, and 4 are vertical sections on the lines 2 2, 3 3, and 4 4 of Fig. 1, respectively.

According to the embodiment of the invention illustrated the inlet or pressure pipe adapted to be connected to a compressed-air reservoir is shown at A, the brake or jam-cylinder pipe for conducting the pressure to the brake is shown at B, and the exhaust or release pipe is shown at C. The valve as a whole is formed of two cylindrical casings D E, each of which is provided with a short internal bore for a piston and with a valve-seat at its end, caps or extensions F and G forming valve-chambers, a diaphragm H between the two cylinders and carrying an internal nut J, all these parts being clamped together in any suitable manner, as by bolts K and valves proper, L M, in said cylinders.

The valve proper, M, is the pressure-valve for admitting pressure to the brake-cylinder. This valve proper has a narrow annular face N exposed to the pressure of the inlet and opens away from the inlet or with the flow of the pressure. In order to maintain it normally shut, I may use springs or other suitable devices; but preferably the piston O has an annular face exposed to the pressure and whose area is opposed to and greater than the exposed area N of the valve. The result of this construction is that the annular piston O serves as a means for pressing the valve against its seat and avoids the necessity of a spring for this purpose.

The valve M is opened by screwing down the operating-shaft P, whereupon the lower end Q bears through a plate R and compresses a spring S until the downward pressure becomes slightly greater than the differential upward pneumatic pressure which normally holds the valve on its seat. This position of the parts is shown in Fig. 3. The valve opens and the pressure is transmitted to the brake-cylinder. As soon as sufficient pressure has accumulated in the brake-cylinder and pipe B the pressure backs up into the valve-chamber G and presses on the under side of the valve and closes the same, the valve being in a nearly-balanced condition when open, so that it may be closed by a minor pressure in the pipe B in amount depending on the pressure put on the spring. As soon as the total back pressure against the valve M is equal to or exceeds the pressure which has been put on the spring S the back pressure will close the valve. The chamber E is open to the atmosphere by way of the passage Z through the operating-shaft, which serves also as an oil-passage, having outlets above and below the screw-threads. It is apparent, therefore, that the amount of pressure to be transmitted to the brake-cylinder can be regulated by regulating the amount of pressure put on the spring S, which in turn is regulated by the amount of movement given the operating-shaft P. The shaft may be turned little by little so as to admit the pressure gradually into the brake-cylinder, or it may be set at once to any desired pressure, and the valve will not close until that pressure is obtained in the brake-pipe, or it may be set at the extreme position at which the valve will be held open positively. The use of a screw-threaded operating member insures that it shall stay in the position in which it is set regardless of the back pressure or movement of the valve, thus maintaining the valve set for a determined pressure. The yielding connection between the shaft and the valve permits such backward movement of the valve without movement of the operating member. Should there be any leakage, as there usually is, in the brake-cylinder and pipe B, the back pressure, which before slightly exceeded that of the spring S, will fall below it. The operating-shaft being maintained in its position, as above explained, the valve will automatically reopen and admit pressure again to the brake-cylinder until the pressure originally set on the spring is exceeded, when the valve will again close. Thus no attention is required beyond that necessary to first set the hand-lever to a determined pressure. With ordinary valves it often occurs that by reason of leakage in the brake-cylinder and pipe the engineer to maintain the pressure has to keep giving the lever a succession of forward movements, watching a pressure-gage constantly to see that the pressure is maintained. This is an important matter, since the engineer's eyes should just then be occupied with other things, and the automatic maintenance of the pressure by my valve after the lever has once been set is of the greatest value. The release-valve L may likewise be held on its seat by a spring $a$ or any other usual or suitable means, but is preferably similiar to the valve M in being provided with an annular piston T of greater area than the exposed area of the valve-face U, so that the pressure in the brake-pipe B constantly holds the valve shut. To open the valve, the shaft P is turned backward until the screw-threaded portion of it rises out of the nut J and engages the end of the valve and lifts the same, Fig. 4, whereupon the air from the brake-pipe B passes out through the exhaust C. In Fig. 1 the lever V is shown in the normal running position in full lines. In dotted lines at V' it is shown in the position for applying the maximum brake-pressure. In dotted lines at $V^2$ it is shown in the position of release.

The upper cap F can be provided with an extension consisting of a stop W, extending upward in the path of the operating-lever V, so as to limit the movement of the latter. The valve may be arranged to be mounted in any suitable manner. For example, I may mount it on the rail X of a car-platform by means of a long bearing-arm Y, which may be bolted to the platform-rail. This, together with the three pipes, gives a sufficiently strong and stiff support.

Various other applications of my improved valve or of parts thereof may be made. For example, the valve M may be used as a pressure-reducing or pressure-regulating valve wherever such valves are applied and will be found extremely sensitive and reliable. It may be made more sensitive by substituting diaphragms for the pistons shown, or other parts may be substituted by various equivalents.

Though I have described with great particularly of detail an apparatus embodying my invention, yet I am not to be understood as limiting the invention to the specific structure disclosed. Various modifications thereof in details and in the arrangement and combination of the parts may be made by those skilled in the art without departure from my invention.

What I claim is—

1. A valve containing a valve proper seating toward the inlet and held to its seat by pressure at the inlet side of the seat, said valve proper having a sufficient area exposed to pressure from the outlet side of the seat to reseat the valve when exposed to a predetermined pressure at its outlet side, in combination with means yieldingly holding said valve unseated until such predetermined pressure accumulates.

2. A valve containing a valve proper seating toward the inlet and normally held to its seat said valve proper having a portion exposed to pressure at the egress side of the valve of sufficient area to seat the valve at a predetermined pressure at its egress side, in combination with means for yieldingly unseating the valve and holding it unseated until such predetermined pressure is reached.

3. A valve containing a valve proper seating toward the inlet and normally held to its seat by pressure at its ingress side, said valve proper having a portion exposed to pressure at its egress side of sufficient area to seat the valve at a predetermined pressure at its egress side, in combination with mechanical means for unseating said valve permitting it to reseat automatically.

4. A valve having opposite differential portions exposed to the pressure at its inlet side and tending to seat it, and having a portion exposed to pressure at its egress side at one end and a portion exposed to atmospheric pressure at its other end, said portion exposed to egress-pressure being of sufficient area to seat said valve at a predetermined pressure at its egress side, whereby said valve will normally remain seated and when unseated will automatically reseat.

5. A valve containing a valve proper opening away from the inlet or with the flow, and means actuated by the inlet-pressure for normally pressing the same against its seat.

6. A valve containing a valve proper opening away from the inlet or with the flow and adapted to close automatically by back pressure from the outlet, and means actuated by the inlet-pressure for normally pressing the same against its seat.

7. A valve containing a valve proper seating toward the inlet-port and having a piston with an area exposed to the inlet-pressure opposed to and greater than the exposed area of the valve so as to maintain the latter on its seat.

8. A valve containing a valve proper seating toward the inlet-port, having a piston with an area exposed to the inlet-pressure opposed to and greater than the area of the valve exposed to said pressure, so as to normally maintain the latter seated, and having an unbalanced area exposed to the back pressure from the outlet side to close the valve after it has been subjected to an opening-pressure sufficient to open it.

9. A valve containing a valve proper seating toward the inlet-port and held to its seat by pressure from the inlet side, said valve having a greater area exposed to pressure from the outlet side than from the inlet side, and an operating member adapted to exert a yielding opening-pressure on said valve proper.

10. A valve adapted to close automatically by back pressure from its outlet and having an operating member which is screw-threaded and thus avoids any movement from the position to which it is set.

11. A valve containing a valve proper seating toward the inlet-port and having a greater area exposed to pressure from the outlet side than from the inlet side whereby it is adapted to close automatically by back pressure from its outlet, and a screw-threaded operating member adapted to exert a yielding opening pressure upon said valve proper.

12. A valve comprising a pair of valve-seats, an intermediate nut, valves proper for said valve-seats, and an operating member screwing through said nut for operating said valves proper.

13. A valve comprising in combination a pair of cylinders, an intermediate nut, a pair of valve-seats, a pair of valves proper having pistons in said cylinders, and an operating member screwing through said nut for operating said valves proper.

14. A valve-casing comprising a pair of cylinders D and E, an intermediate nut J, and a pair of valve-chambers F and G, all arranged in line and clamped together.

15. In a valve, an inlet-valve proper, and an outlet-valve proper, and means for operating them, said outlet-valve proper having differential portions exposed to pressure at its inlet side, and normally adapted to retain it seated.

16. In a valve the combination with an inlet-valve proper, of an outlet-valve proper opening with the flow, and having opposite differential portions at its inlet side exposed to fluid-pressure, and adapted to normally hold the valve proper seated, means for unseating said valves proper, and means for reseating said outlet-valve proper.

17. In valves the combination with an inlet-valve proper, of a tubular outlet-valve proper, and means for operating said parts extending through said outlet-valve proper.

18. In valves the combination with inlet and outlet valves proper held toward their seats by fluid-pressure, a chamber opposite one end of said valves open to atmospheric pressure, and means in said chamber for operating said valves.

19. In valves, inlet and outlet valves proper disposed on the same axial line and movable longitudinally thereof, and means for operating said valves proper disposed and rotating on the same axial line and movable longitudinally thereof.

In witness whereof I have hereunto signed my name in the presence of two subscribing witnesses.

MILAN W. HALL.

Witnesses:
 GEORGE H. FRASER,
 FRED WHITE.